Patented July 7, 1942

2,289,044

UNITED STATES PATENT OFFICE 2,289,044

PREPARATION OF ORGANIC SULPHONATES

John Ross, Manhasset, N. Y., assignor to Colgate-Palmolive-Peet Company, Jersey City, N. J., a corporation of Delaware No Drawing. Application December 28, 1940,
Serial No. 372,179

17 Claims. (Cl. 260—513)

This invention is directed to the preparation of organic sulphonates and is particularly related to the conversion of alcohols and esters to organic sulphonic acids. The process is also directed to the removal of unsaponifiable non-sulphonated material from the products. The sulphonate products are stable materials having valuable wetting, emulsifying and deterging properties.

The prior art methods have in most cases been directed to reactions in aqueous media and solvent purification procedures, which methods are generally unsatisfactory. The present invention is directed to a method of producing relatively pure organic sulphonates from alcohols and esters and also to a method of removing organic unsaponifiable material therefrom by an inexpensive procedure without the use of costly and highly inflammable solvents.

In accordance with the present invention, an alcohol, ester or an ester salt is reacted with a sulphite salt while mixed with a flux or salt that is liquid at temperature desired, e. g. a fatty acid soap at a relatively high temperature so that the mixture is in a molten or fluid condition, while passing a strong current of inert gas therethrough advantageously under reduced pressure, and in the substantial absence of air and water (liquid or vapor).

The addition of the flux, that is, the fatty acid material, or the soap thereof, is an essential feature of the present invention. The treatment of most alcohols, esters or ester salts alone by this method will not operate because it is not usually possible to fuse anhydrous sulphonate salt products, charring and decomposition generally taking place. However, it has now been found that when an alcohol, ester or ester salt or organic sulphonate salt is admixed with a naphthenic acid soap, fatty acid soap or similar flux, it is possible to fuse the homogeneous, anhydrous mass and thus permit thorough agitation, e. g. by the passage of inert gas therethrough, and to volatilize the higher boiling non-saponified or non-sulphonated ingredients therefrom.

The above treatment substantially completely converts the alcohols or esters (including ester salts) to organic sulphonate salts and removes substantially all of the unsaponified organic material from the saponified mass. The treatment may be carried out at various temperatures, preferably ranging from about 200° to about 350° C. In this temperature range, the substantially anhydrous mixed organic sulphonate-fatty acid soap is in a freely fluid condition so that it may be intimately mixed, thus insuring uniformity of temperature throughout the mass and preventing any portions of the mass, for example those portions in contact with the walls of the vessel, from being overheated and subjected to decomposition. When employing organic ester salts, the mixing may advantageously be accomplished by passing a strong current of non-aqueous, inert gas or vapor such as carbon dioxide, nitrogen, gasoline, benzene and/or carbon monoxide through the molten anhydrous mixture, which gas serves not only to agitate the liquid mass, but also to assist materially in the vaporization of the unsaponifiable materials which are distilled off and to blanket the mass and exclude air, thus preventing oxidation at the high temperatures used. The unsaponifiable material may be vaporized from the saponified mass and may be condensed in a suitable condenser substantially free from any inert vapor or gas which may be used. When employing alcohols or simple organic esters, the process should be operated in a closed system with suitable agitation, since these materials would be removed as a vapor under the above suggested conditions of operation. After completion of the conversion of the alcohols or esters to sulphonate salts, the treatment under atmospheric or reduced pressure with an inert gas or vapor may be applied to the fluxed sulphonate salt products in order to remove any volatile reactants or products.

The products obtained by the present process are free from objectionable odor and are substantially free from non-sulphonated or unsaponifiable material. The saponified product obtained by the process of this invention is light in color, as the process causes little or no darkering if carried out under proper conditions.

The organic sulphonate-fatty acid soap mixtures after the high temperature sulphonation treatment show better washing and foaming properties than the mixed material not so treated, and may be used directly as a detergent. The mixed salts may be separated to their individual constituents either directly or by first splitting the salts to the corresponding acids and then separating the fatty acid from the organic sulphonic acid. The separation may be accomplished in most cases by dissolving the treated salts in water and salting the soap out of the solution. It may also be accomplished by acidification and separation of the aqueous solution of sulphonic acids from the water-insoluble fatty acids. The purified fatty acids may be water washed to remove residual sulphonic acids. Extraction of the aqueous solution of sulphonic acids with immiscible solvents such as ether or gasoline to remove residual fatty acid therefrom may also be used.

The hot anhydrous salt mixture from the anhydrous high temperature reaction may be cooled by various methods, preferably in the substantial absence of air. For example, it may be introduced under the surface of water or a hydrated soap in order to dissolve it more readily. It may be cooled in a suitable pulverizing device, in a spray tower, or on a cooling roll, with or without water, steam or inert gases.

The high temperature treatment of the anhydrous salts may be operated so that the organic ester and sodium sulphite may be added to or along with fatty acid soap, or the organic ester and fatty acid may be added with alkali and sodium sulphite, or any combination so long as the flux, that is, the fatty acid soap or fatty acid and alkali is present when it is attempted to liquefy the anhydrous organic ester salts or organic sulphonate salt products. One way to carry out the treatment starting with saponified material is to maintain in a single vessel or in a series of vessels a substantial quantity of some of the anhydrous mixture at the relatively high temperature of 200° to 350° C., at which it is thinly fluid, and to add the organic ester salt, sodium sulphite and the rest of the fluxing material, continuously or in successive portions, to the first or sole vessel with corresponding withdrawals of the treated material from the last or sole treating vessel. The addition of reactants is made at a sufficiently slow rate that the body of material remains molten and the reactants stay in the vessel or vessels for a time sufficient to complete the reaction. When operating with organic ester salts, the treating vessels may be vapor separating chambers through which a non-aqueous inert gas or vapor is passed to remove volatile non-saponified material. When employing an alcohol or a non-salt organic ester which is volatile under the reaction conditions, the process may be conducted by passing the vaporized alcohol or ester upwardly through a tower with baffles or packing counter-current to a downwardly flowing mixture of molten flux and sodium sulphite and/or sodium acid sulphite.

When the lower temperatures, in the neighborhood of 200° to 250° C., are used for the reaction, a longer time of treatment is generally required to provide the substantially complete conversion and separation of the unsaponifiable constituents. The time required for the conversion depends to a great extent on the material treated and the temperature of the treatment. In general, the rapidity of separation of unsaponifiable material from the sulphonate salt products is greater at higher temperatures, at higher vacua, and with injection of greater quantities of non-aqueous inert gas or vapor. The sulphonate production and the purification are more rapid and effective at higher temperatures, for example 300° to 325° C., than at lower temperatures, for example 225° to 250° C. In general, temperatures of 250° to 325° C. are preferred for rapid and complete reactions and removal of non-saponified material. In some cases, temperatures in excess of 350° C. may be used, but it is advantageous to avoid the use of such high temperatures because of the danger of undesirable decomposition. Lower temperatures and lower proportions of flux may be used to obtain the desired fluidity, if sodium sulphate or like inorganic salts are not present in the organic alcohol or ester material under treatment.

Example I 200 grams of U. S. P. oleic acid are heated in a four neck flask with 40 grams of soda ash, while superheated steam is continuously passed therethrough. When the temperature has reached 250° C., and all of the oleic acid-soda ash mixture has been in the reaction vessel for about ten minutes, the treatment with superheated steam is discontinued and carbon dioxide is then passed through the molten mixture. 100 grams of a mixture obtained by roll drying an aqueous solution of a mixture of 36.5 grams sodium sulphite and 62 grams sodium salt of lauryl alcohol sulphate are gradually added. The treatment with carbon dioxide is continued for about one and one-half hour at a temperature between about 280° and 312° C. Any non-saponified material is separated as a distillate with the carbon dioxide. The mixed salts are cooled out of contact with air by pouring into water. The resulting solution is acidified with dilute sulphuric acid. The water-insoluble organic carboxylic acids are separated from the lower aqueous layer of lauryl sulphonic acids. The carboxylic acids are washed with water and the aqueous liquid added to the sulphonic acid solution. The sulphonic acid solution containing about 10% sulphuric acid is heated on a steam bath for about two hours to destroy any unstable organic sulphates remaining in the mixture. The sulphonic acid solution is neutralized with caustic soda solution and then extracted with ethyl ether. The aqueous solution is then dried. The dried material is extracted with isopropanol to separate the active ingredient. The isopropanol solution is dried to obtain a stable lauryl sulphonate sodium salt of a good color and odor.

Example II 750 grams of tallow and 250 grams of olive oil are heated with an equivalent weight of soda ash while superheated steam is passed continuously through the molten mixture. The glycerine and other volatile organic matter set free is fractionately condensed from the steam. When the fats have been completely saponified and the temperature is above about 250° C., the steam treatment is discontinued and a stream of carbon dioxide is passed through the molten mixture. 400 grams of a dry intimate mixture of 240 grams of the sodium salts of the sulphates of the mixed higher alcohols obtained by reducing coconut oil fatty acids and 160 grams of sodium sulphite are gradually added to the mixture, meanwhile continuing the blowing with carbon dioxide and maintaining the mixture molten and anhydrous. After all of the mixture has been added, the heat treatment with carbon dioxide blowing is continued for about another two hours at a temperature of about 300° to 320° C. The mixed salts are cooled out of contact with the air by partially hydrating with water. The resulting product may be formed into stable detergent bars or cakes, or may be spray dried to a powder, or roll dried to a chip, ribbon or flake. The product is an excellent detergent, water softener and textile assistant.

The organic alcohols or esters which may be treated by the present process preferably contain at least six carbon atoms and include long-chain mono- and polyhydric straight, cyclic and branched chain alcohols such as lauryl alcohol, oleyl alcohol, hexyl alcohol, cetyl alcohol, hexyl octyl carbinol, diheptyl carbinol, methyl undecyl carbinol, dipentyl carbinol, cyclohexyl alcohol, benzyl alcohol, hexyl benzyl alcohol; hydroxy fatty acids such as hydroxy stearic acid; hydroxy aliphatic ether such as dodecyl ether of diethylene glycol, stearyl glycerol ether; as well as the organic and inorganic acid esters thereof such as the acetate, sulphate salts, chlorides, bromides, borates, phosphates, and laurates thereof, including such specific esters as sulphated stearic acid sodium salt, sodium salt of chlorinated palmitic acid, cetyl sulphate potassium salt, dodecyl ether of diethylene glycol monosulphuric acid ester and its salts, stearyl ether of glycerol monosulphate, glycerol sulphuric acid salts, sulphuric acid esters of cyclohexyl and other naphthenyl alcohols, benzyl sulphate, lauryl benzyl sulphate, chlorinated paraffin, cetyl chloride, lauryl acetate, cetyl palmitate and innumerable other organic alcohols, esters and ester salts or mixtures thereof.

The sulphites may be sodium sulphite, sodium acid sulphite, potassium sulphite, potassium acid sulphite, calcium sulphite, magnesium sulphite or various mixtures thereof. When operating with alcohols the acid sulphites should be employed.

Various alkaline materials may be used for the neutralization, including carbonated alkalies, soda ash, potassium carbonate, limestone, marble dust, magnesium carbonate, dolomite, caustic alkalies, etc., or mixtures thereof. When employing sodium hydroxide, lime and caustic potash with the sulphonic acid products, the alkali should not be in excess of that required for neutralization in order to prevent de-sulphonation of the product. It is also desirable to have sodium sulphite present during the treatment to prevent this decomposition. Soda ash is preferred because it is cheap, effective and produces a directly usable sodium soap. It will be necessary to vary the temperatures used if other alkaline materials than caustic soda or soda ash are used, because of the differences in the melting points of the soaps formed with metals other than sodium. In any event, the temperature must be sufficiently high to insure the necessary fluidity.

It is possible to add the organic fluxing acid materials in various forms to the alcohols, esters or ester salts at any point during the process. For example, various oils, fats and waxes may be added to the materials to be sulphonated before any processing has been effected to remove various impurities which they contain. Suitable addition agents are wool fat, certain grades of garbage grease, whale oil, shark, menhaden and other fish oils, spermaceti, tallow, coconut oil, olive oil, tall oil, cottonseed oil, linseed oil, Chinawood oil, oiticica oil, soya bean oil, palm oil, montan wax, carnauba wax, Japan wax, Chinese wax, oxidized petroleum, as well as the various individual acids thereof, such as caproic, lauric, stearic, palmitic, oleic, myristic, naphthenic, or behenic acids, their halogenated derivatives or mixtures of any of these fats, oils, waxes, resins and acids. The addition agent or agents should be selected so that the salt or salts thereof melt in the desired range and do not decompose. The preferred acid would be one which also has a low boiling point, such as lauric acid, capric acid, or myristic acid or coconut oil, so that the mixed acids obtained by acidulation of the mixed salts may be readily fractionated to recover the individual fatty acids and organic sulphonic acids.

The various new sulphonate compositions may also be used in combination with any of the common auxiliary agents. Suitable addition agents include coloring matter, such as dyes, lakes, pigments; abrasives and fillers such as silica, pumice, feldspar, precipitated chalk, infusorial earth, bentonite, talc; solvents and diluents including carbon tetrachloride, perchlorethylene, trichlorethylene, glycerine, water, ethyl alcohol, glycol, tetrahydrofurfuryl alcohol, phenol, cyclohexanol, water, tetralin, decalin, pine oil, mineral oil, mineral oil extracts, and naphtha; perfumes and deodorants; germicides such as phenol and organic or inorganic mercury compounds; any of the common water-soluble alkali metal or ammonium salts, and various mixtures thereof. The type of addition agent to be used will depend, of course, on the ultimate use of the new purified composition. The various ingredients may be mixed by any of the common methods such as milling, stirring, kneading, crutching, fusing, and drying of mixed solutions or dispersions.

As many widely different embodiments of the invention may be made without departing from the spirit and scope thereof, it is to be understood that the application is not limited to the specific proportions or embodiments thereof except as defined in the following claims.

I claim:
1. The process which comprises reacting an organic compound of the class consisting of esters and ester salts, with an inorganic sulphite in a substantially anhydrous molten soap of an organic monocarboxylic acid at a temperature above the melting point of the reaction mixture while agitating the mixture.

2. The process which comprises reacting an organic compound of the class consisting of esters and ester salts, with an alkali metal sulphite in a substantially anhydrous molten soap of a fatty acid in an inert atmosphere and at a temperature above the melting point of the resulting mixture while agitating the mixture.

3. The process which comprises reacting an organic compound having at least six carbon atoms of the class consisting of esters and ester salts, with an inorganic sulphite in a substantially anhydrous molten soap of an organic monocarboxylic acid at a temperature above the melting point of the reaction mixture while agitating the mixture.

4. The process which comprises reacting an organic compound having at least six carbon atoms of the class consisting of esters and ester salts, with an alkali metal sulphite in a substantially anhydrous molten soap of an organic monocarboxylic acid at a temperature above the melting point of the resulting mixture while agitating the mixture.

5. The process which comprises reacting an organic compound having at least six carbon atoms of the class consisting of esters and ester salts, with an alkali metal sulphite in a substantially anhydrous molten soap of a fatty acid at a temperature above the melting point of the resulting mixture while agitating the mixture.

6. The process which comprises reacting an organic compound of the class consisting of esters and ester salts, with an inorganic sulphite in a substantially anhydrous molten soap of an organic monocarboxylic acid at a temperature above the melting point of the reaction mixture while blowing with a non-aqueous inert gas.

7. The process which comprises reacting an organic ester salt with an inorganic sulphite in a substantially anhydrous molten soap of an organic monocarboxylic acid at a temperature above the melting point of the reaction mixture while blowing with an inert gas.

8. The process which comprises reacting an organic sulphate salt with an inorganic sulphite in a substantially anhydrous molten soap of an organic monocarboxylic acid at a temperature above the melting point of the reaction mixture while agitating the mixture.

9. The process which comprises reacting an aliphatic ester with an inorganic sulphite in a substantially anhydrous molten soap of an organic monocarboxylic acid at a temperature above the melting point of the reaction mixture while agitating the mixture.

10. The process which comprises reacting an alkyl compound having at least six carbon atoms of the class consisting of esters and ester salts, with an inorganic sulphite in a substantially anhydrous molten soap of an organic monocarboxylic acid at a temperature above the melting point of the reaction mixture while agitating the mixture.

11. The process which comprises reacting an alkyl ester salt having at least six carbon atoms with an inorganic sulphite in a substantially anhydrous molten soap of an organic monocarboxylic acid at a temperature above the melting point of the reaction mixture while blowing with an inert gas.

12. The process which comprises reacting an alkyl sulphate salt having at least six carbon atoms with an inorganic sulphite in a substantially anhydrous molten soap of an organic monocarboxylic acid at a temperature above the melting point of the reaction mixture while blowing with an inert gas.

13. The process which comprises reacting an alkyl halide having at least six carbon atoms with an inorganic sulphite in a substantially anhydrous molten soap of an organic monocarboxylic acid at a temperature above the melting point of the reaction mixture while agitating the mixture.

14. The process which comprises reacting an alkyl chloride having at least six carbon atoms with an alkali metal sulphite in a substantially anhydrous molten soap of an organic monocarboxylic acid at a temperature above the melting point of the resulting mixture while agitating the mixture.

15. The process which comprises reacting cetyl sulphate sodium salt with sodium sulphite in a substantially anhydrous molten soap of a fatty acid at a temperature above the melting point of the resulting mixture while blowing with carbon dioxide.

16. The process which comprises reacting a lauryl sulphate alkali metal salt with an alkali metal sulphite in a substantially anhydrous molten soap of a fatty acid at a temperature above the melting point of the resulting mixture while agitating the mixture.

17. The process which comprises reacting a mixture of sodium salts of sulphates of the coconut oil fatty alcohols with sodium sulphite in a substantially anhydrous molten soap of a fatty acid at a temperature above the melting point of the resulting mixture while agitating the mixture.

JOHN ROSS.